(12) United States Patent
Carr (10) Patent No.: US 10,972,251 B2
(45) Date of Patent: Apr. 6, 2021

(54) SECURE WEB BROWSING VIA HOMOMORPHIC ENCRYPTION

(71) Applicant: Enveil, Inc., Fulton, MD (US)

(72) Inventor: Ryan Carr, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 337 days.

(21) Appl. No.: 15/876,043

(22) Filed: Jan. 19, 2018

(65) Prior Publication Data

US 2018/0212756 A1 Jul. 26, 2018

Related U.S. Application Data

(60) Provisional application No. 62/448,916, filed on Jan. 20, 2017, provisional application No. 62/448,883, (Continued)

(51) Int. Cl.
| | |
|---|---|
| *H04L 9/00* | (2006.01) |
| *H04L 9/30* | (2006.01) |
| *H04L 29/06* | (2006.01) |
| *G06F 7/552* | (2006.01) |
| *G06F 1/03* | (2006.01) |
| *G06F 7/72* | (2006.01) |

(Continued)

(52) U.S. Cl.
CPC ............ *H04L 9/008* (2013.01); *G06F 1/0307* (2013.01); *G06F 7/552* (2013.01); *G06F 7/723* (2013.01); *G06F 7/728* (2013.01); *G06F 9/30014* (2013.01); *H03M 7/24* (2013.01); *H04L 9/30* (2013.01); *H04L 63/0428* (2013.01); *H04L 63/0442* (2013.01); *H04L 2209/30* (2013.01)

(58) Field of Classification Search
None
See application file for complete search history.

(56) References Cited

U.S. PATENT DOCUMENTS

| | | |
|---|---|---|
| 5,732,390 A | 3/1998 | Katayanagi et al. |
| 6,178,435 B1 | 1/2001 | Schmookler |
| | (Continued) | |

FOREIGN PATENT DOCUMENTS

| | | |
|---|---|---|
| EP | 2873186 B1 | 3/2018 |
| JP | 5680007 B2 | 3/2015 |
| | (Continued) | |

OTHER PUBLICATIONS

"International Search Report" and "Written Opinion of the International Searching Authority," Patent Cooperation Treaty Application No. PCT/US2018/014535, dated Apr. 19, 2018, 9 pages.

(Continued)

*Primary Examiner* — William J. Goodchild
(74) *Attorney, Agent, or Firm* — Carr & Ferrell LLP (57) ABSTRACT

Systems and methods for end-to-end encryption of a web browsing process are described herein. A web query is encrypted at a client using a homomorphic encryption scheme. The encrypted query is sent to a server where the encrypted query is evaluated over web content to generate an encrypted response without decrypting the encrypted query and without decrypting the response. The encrypted response is sent to the client where it is decrypted to obtain the results of the query without revealing the query or results to the owner of the web content, an observer, or an attacker.

20 Claims, 4 Drawing Sheets

Related U.S. Application Data filed on Jan. 20, 2017, provisional application No. 62/448,885, filed on Jan. 20, 2017, provisional application No. 62/462,818, filed on Feb. 23, 2017.

(51) Int. Cl.
  *G06F 9/30* (2018.01)
  *H03M 7/24* (2006.01)

(56) References Cited

U.S. PATENT DOCUMENTS

| | | | |
|---|---|---|---|
| 6,745,220 | B1 | 6/2004 | Hars |
| 6,748,412 | B2 | 6/2004 | Ruehle |
| 6,910,059 | B2 | 6/2005 | Lu et al. |
| 7,712,143 | B2 | 5/2010 | Comlekoglu |
| 7,937,270 | B2 | 5/2011 | Smaragdis et al. |
| 8,515,058 | B1 | 8/2013 | Gentry |
| 8,565,435 | B2 | 10/2013 | Gentry et al. |
| 8,781,967 | B2 | 7/2014 | Tehranchi et al. |
| 8,832,465 | B2 | 9/2014 | Gulati et al. |
| 9,059,855 | B2 | 6/2015 | Johnson et al. |
| 9,094,378 | B1 | 7/2015 | Yung et al. |
| 9,189,411 | B2 | 11/2015 | Mckeen et al. |
| 9,215,219 | B1 | 12/2015 | Krendelev et al. |
| 9,288,039 | B1 | 3/2016 | Monet et al. |
| 9,491,111 | B1 | 11/2016 | Roth et al. |
| 9,503,432 | B2 | 11/2016 | El Emam et al. |
| 9,514,317 | B2 | 12/2016 | Martin et al. |
| 9,565,020 | B1 | 2/2017 | Camenisch et al. |
| 9,577,829 | B1 | 2/2017 | Roth et al. |
| 9,652,609 | B2 | 5/2017 | Kang et al. |
| 9,846,787 | B2 | 12/2017 | Johnson et al. |
| 9,852,306 | B2 | 12/2017 | Cash et al. |
| 9,942,032 | B1 | 4/2018 | Kornaropoulos et al. |
| 9,946,810 | B1 | 4/2018 | Trepetin et al. |
| 9,973,334 | B2 | 5/2018 | Hibshoosh et al. |
| 10,027,486 | B2 | 7/2018 | Liu |
| 10,055,602 | B2 | 8/2018 | Deshpande et al. |
| 10,073,981 | B2 | 9/2018 | Arasu et al. |
| 10,075,288 | B1 | 9/2018 | Khedr et al. |
| 10,129,028 | B2 | 11/2018 | Kamakari et al. |
| 10,148,438 | B2 | 12/2018 | Evancich et al. |
| 10,181,049 | B1 | 1/2019 | El Defrawy et al. |
| 10,210,266 | B2 | 2/2019 | Antonopoulos et al. |
| 10,235,539 | B2 | 3/2019 | Ito et al. |
| 10,255,454 | B2 | 4/2019 | Kamara et al. |
| 10,333,715 | B2 | 6/2019 | Chu et al. |
| 10,375,042 | B2 | 8/2019 | Chaum |
| 10,396,984 | B2 | 8/2019 | French et al. |
| 10,423,806 | B2 | 9/2019 | Cerezo Sanchez |
| 10,489,604 | B2 | 11/2019 | Yoshino et al. |
| 10,496,631 | B2 | 12/2019 | Tschudin et al. |
| 10,644,876 | B2 | 5/2020 | Williams et al. |
| 10,693,627 | B2 | 6/2020 | Carr |
| 10,721,057 | B2 | 7/2020 | Carr |
| 10,728,018 | B2 | 7/2020 | Williams et al. |
| 10,790,960 | B2 | 9/2020 | Williams et al. |
| 10,817,262 | B2 | 10/2020 | Carr et al. |
| 10,873,568 | B2 | 12/2020 | Williams |
| 10,880,275 | B2 | 12/2020 | Williams |
| 10,902,133 | B2 | 1/2021 | Williams et al. |
| 10,903,976 | B2 | 1/2021 | Williams et al. |
| 2002/0032712 | A1 | 3/2002 | Miyasaka et al. |
| 2002/0073316 | A1 | 6/2002 | Collins et al. |
| 2002/0104002 | A1 | 8/2002 | Nishizawa et al. |
| 2003/0037087 | A1 | 2/2003 | Rarick |
| 2003/0059041 | A1 | 3/2003 | MacKenzie et al. |
| 2003/0110388 | A1 | 6/2003 | Pavlin et al. |
| 2004/0167952 | A1 | 8/2004 | Gueron et al. |
| 2005/0008152 | A1 | 1/2005 | MacKenzie |
| 2005/0076024 | A1 | 4/2005 | Takatsuka et al. |
| 2005/0259817 | A1* | 11/2005 | Ramzan ............... G06F 21/6227 380/46 |
| 2006/0008080 | A1 | 1/2006 | Higashi et al. |
| 2006/0008081 | A1 | 1/2006 | Higashi et al. |
| 2007/0053507 | A1 | 3/2007 | Smaragdis et al. |
| 2007/0095909 | A1 | 5/2007 | Chaum |
| 2007/0140479 | A1 | 6/2007 | Wang et al. |
| 2007/0143280 | A1 | 6/2007 | Wang et al. |
| 2009/0037504 | A1 | 2/2009 | Hussain |
| 2009/0083546 | A1 | 3/2009 | Staddon et al. |
| 2009/0193033 | A1 | 7/2009 | Ramzan et al. |
| 2009/0268908 | A1 | 10/2009 | Bikel et al. |
| 2009/0279694 | A1 | 11/2009 | Takahashi et al. |
| 2009/0287837 | A1 | 11/2009 | Felsher |
| 2010/0202606 | A1 | 8/2010 | Almeida |
| 2010/0205430 | A1 | 8/2010 | Chiou et al. |
| 2010/0241595 | A1 | 9/2010 | Felsher |
| 2011/0026781 | A1 | 2/2011 | Osadchy et al. |
| 2011/0107105 | A1 | 5/2011 | Hada |
| 2011/0110525 | A1* | 5/2011 | Gentry ............... H04L 9/14 380/285 |
| 2011/0243320 | A1 | 10/2011 | Halevi et al. |
| 2011/0283099 | A1 | 11/2011 | Nath et al. |
| 2012/0039469 | A1 | 2/2012 | Mueller et al. |
| 2012/0054485 | A1* | 3/2012 | Tanaka ............... H04N 7/18 713/150 |
| 2012/0066510 | A1 | 3/2012 | Weinman |
| 2012/0201378 | A1 | 8/2012 | Nabeel et al. |
| 2012/0265794 | A1 | 10/2012 | Niel |
| 2012/0265797 | A1 | 10/2012 | Niel |
| 2013/0010950 | A1 | 1/2013 | Kerschbaum |
| 2013/0051551 | A1 | 2/2013 | El Aimani |
| 2013/0054665 | A1 | 2/2013 | Felch |
| 2013/0114811 | A1* | 5/2013 | Boufounos ............... H04K 1/00 380/255 |
| 2013/0148868 | A1 | 6/2013 | Troncoso Pastoriza et al. |
| 2013/0170640 | A1 | 7/2013 | Gentry |
| 2013/0191650 | A1 | 7/2013 | Balakrishnan et al. |
| 2013/0195267 | A1 | 8/2013 | Alessio et al. |
| 2013/0198526 | A1 | 8/2013 | Goto |
| 2013/0216044 | A1 | 8/2013 | Gentry et al. |
| 2013/0230168 | A1 | 9/2013 | Takenouchi |
| 2013/0237242 | A1* | 9/2013 | Oka ............... H04W 4/02 455/456.1 |
| 2013/0246813 | A1 | 9/2013 | Mori et al. |
| 2013/0326224 | A1 | 12/2013 | Yavuz |
| 2013/0339722 | A1 | 12/2013 | Krendelev et al. |
| 2013/0339751 | A1 | 12/2013 | Sun et al. |
| 2013/0346741 | A1 | 12/2013 | Kim et al. |
| 2013/0346755 | A1 | 12/2013 | Nguyen et al. |
| 2014/0164758 | A1 | 6/2014 | Ramamurthy et al. |
| 2014/0189811 | A1 | 7/2014 | Taylor et al. |
| 2014/0233727 | A1 | 8/2014 | Rohloff et al. |
| 2014/0281511 | A1 | 9/2014 | Kaushik et al. |
| 2014/0355756 | A1 | 12/2014 | Iwamura et al. |
| 2015/0100785 | A1 | 4/2015 | Joye et al. |
| 2015/0100794 | A1 | 4/2015 | Joye et al. |
| 2015/0205967 | A1 | 7/2015 | Naedele et al. |
| 2015/0215123 | A1 | 7/2015 | Kipnis et al. |
| 2015/0227930 | A1 | 8/2015 | Quigley et al. |
| 2015/0229480 | A1 | 8/2015 | Joye et al. |
| 2015/0244517 | A1 | 8/2015 | Nita |
| 2015/0248458 | A1 | 9/2015 | Sakamoto |
| 2015/0304736 | A1 | 10/2015 | Lal et al. |
| 2015/0358152 | A1 | 12/2015 | Ikarashi et al. |
| 2015/0358153 | A1 | 12/2015 | Gentry |
| 2016/0004874 | A1 | 1/2016 | Ioannidis et al. |
| 2016/0036826 | A1 | 2/2016 | Pogorelik et al. |
| 2016/0072623 | A1 | 3/2016 | Joye et al. |
| 2016/0105402 | A1 | 4/2016 | Kupwade-Patil et al. |
| 2016/0105414 | A1 | 4/2016 | Bringer et al. |
| 2016/0119346 | A1 | 4/2016 | Chen et al. |
| 2016/0140348 | A1 | 5/2016 | Nawaz et al. |
| 2016/0179945 | A1 | 6/2016 | Lastra Diaz et al. |
| 2016/0182222 | A1* | 6/2016 | Rane ............... H04L 9/008 713/168 |
| 2016/0323098 | A1 | 11/2016 | Bathen |
| 2016/0335450 | A1 | 11/2016 | Yoshino et al. |
| 2016/0344557 | A1 | 11/2016 | Chabanne et al. |
| 2016/0350648 | A1 | 12/2016 | Gilad-Bachrach et al. |
| 2017/0070340 | A1 | 3/2017 | Hibshoosh et al. |
| 2017/0070351 | A1 | 3/2017 | Yan |
| 2017/0099133 | A1 | 4/2017 | Gu et al. |

(56) References Cited

U.S. PATENT DOCUMENTS

| | | |
|---|---|---|
| 2017/0134158 A1 | 5/2017 | Pasol et al. |
| 2017/0185776 A1 | 6/2017 | Robinson et al. |
| 2017/0264426 A1 | 9/2017 | Joye et al. |
| 2018/0091466 A1 | 3/2018 | Friedman et al. |
| 2018/0139054 A1 | 5/2018 | Chu et al. |
| 2018/0198601 A1 | 7/2018 | Laine et al. |
| 2018/0204284 A1 | 7/2018 | Cerezo Sanchez |
| 2018/0212751 A1 | 7/2018 | Williams et al. |
| 2018/0212752 A1 | 7/2018 | Williams et al. |
| 2018/0212753 A1 | 7/2018 | Williams |
| 2018/0212754 A1 | 7/2018 | Williams et al. |
| 2018/0212755 A1 | 7/2018 | Williams et al. |
| 2018/0212757 A1 | 7/2018 | Carr |
| 2018/0212758 A1 | 7/2018 | Williams et al. |
| 2018/0212759 A1 | 7/2018 | Williams et al. |
| 2018/0212775 A1 | 7/2018 | Williams |
| 2018/0212933 A1 | 7/2018 | Williams |
| 2018/0224882 A1 | 8/2018 | Carr |
| 2018/0234254 A1 | 8/2018 | Camenisch et al. |
| 2018/0267981 A1 | 9/2018 | Sirdey et al. |
| 2018/0270046 A1 | 9/2018 | Carr |
| 2018/0276417 A1 | 9/2018 | Cerezo Sanchez |
| 2018/0343109 A1 | 11/2018 | Koseki et al. |
| 2018/0349632 A1 | 12/2018 | Bent et al. |
| 2018/0359097 A1 | 12/2018 | Lindell |
| 2018/0373882 A1 | 12/2018 | Veugen |
| 2019/0013950 A1 | 1/2019 | Becker et al. |
| 2019/0042786 A1 | 2/2019 | Williams et al. |
| 2019/0108350 A1 | 4/2019 | Bohli et al. |
| 2019/0158272 A1 | 5/2019 | Chopra et al. |
| 2019/0229887 A1 | 7/2019 | Ding et al. |
| 2019/0238311 A1 | 8/2019 | Zheng |
| 2019/0251553 A1 | 8/2019 | Ma et al. |
| 2019/0251554 A1 | 8/2019 | Ma et al. |
| 2019/0253235 A1 | 8/2019 | Zhang et al. |
| 2019/0260585 A1 | 8/2019 | Kawai et al. |
| 2019/0280880 A1 | 9/2019 | Zhang et al. |
| 2019/0312728 A1 | 10/2019 | Poeppelmann |
| 2019/0327078 A1 | 10/2019 | Zhang et al. |
| 2019/0334716 A1 | 10/2019 | Kocsis et al. |
| 2019/0349191 A1 | 11/2019 | Soriente et al. |
| 2019/0371106 A1 | 12/2019 | Kaye |
| 2020/0134200 A1 | 4/2020 | Williams et al. |
| 2020/0150930 A1 | 5/2020 | Carr et al. |
| 2020/0204341 A1 | 6/2020 | Williams et al. |
| 2020/0382274 A1 | 12/2020 | Williams et al. |
| 2020/0396053 A1 | 12/2020 | Williams et al. |
| 2021/0034765 A1 | 2/2021 | Williams et al. |

FOREIGN PATENT DOCUMENTS

| | | |
|---|---|---|
| KR | 101386294 B1 | 4/2014 |
| WO | WO2014105160 A1 | 7/2014 |
| WO | WO2015094261 A1 | 6/2015 |
| WO | WO2016003833 A1 | 1/2016 |
| WO | WO2016018502 A1 | 2/2016 |
| WO | WO2018091084 A1 | 5/2018 |
| WO | WO2018136801 A1 | 7/2018 |
| WO | WO2018136804 A1 | 7/2018 |
| WO | WO2018136811 A1 | 7/2018 |

OTHER PUBLICATIONS

"International Search Report" and "Written Opinion of the International Searching Authority," Patent Cooperation Treaty Application No. PCT/US2018/014530, dated Apr. 23, 2018, 7 pages.

"International Search Report" and "Written Opinion of the International Searching Authority," Patent Cooperation Treaty Application No. PCT/US2018/014551, dated Apr. 24, 2018, 8 pages.

Petition to Insitute Derivation Proceeding Pursuant to 35 USC 135; Case No. DER2019-00009, US Patent and Trademark Office Patent Trial and Appeal Board; Jul. 26, 2019, 272 pages. (2 PDFs).

SCAMP Working Paper L29/11, "A Woods Hole Proposal Using Striping," Dec. 2011, 14 pages.

O'Hara, Michael James, "Shovel-ready Private Information Retrieval," Dec. 2015, 4 pages.

Carr, Benjamin et al., "Proposed Laughing Owl," NSA Technical Report, Jan. 5, 2016, 18 pages.

Carr, Benjamin et al., "A Private Stream Search Technique," NSA Technical Report, Dec. 1, 2015, 18 pages.

Drucker et al., "Paillier-encrypted databases with fast aggregated queries," 2017 14th IEEE Annual Consumer Communications & Networking Conference (CCNC), Jan. 8-11, 2017, pp. 848-853.

Tu et al., "Processing Analytical Queries over Encrypted Data," Proceedings of the VLDB Endowment, vol. 6, Issue No. 5, Mar. 13, 2013. pp. 289-300.

Boneh et al., "Private Database Queries Using Somewhat Homomorphic Encryption", Cryptology ePrint Archive: Report 2013/422, Standford University [online], Jun. 27, 2013, [retrieved on Dec. 9, 2019], 22 pages.

Chen et al., "Efficient Multi-Key Homomorphic Encryption with Packed Ciphertexts with Application to Oblivious Neural Network Inference", CCS '19 Proceedings of the 2019 ACM SIGSAC Conference on Computer and Communications Security, May 19, 2019. pp. 395-412.

Armknecht et al., "A Guide to Fully Homomorphic Encryption" IACR Cryptology ePrint Archive: Report 2015/1192 [online], Dec. 14, 2015, 35 pages.

Bayar et al., "A Deep Learning Approach to Universal Image Manipulation Detection Using a New Convolutional Layer", IH&MMSec 2016, Jun. 20-22, 2016. pp. 5-10.

Juvekar et al. "Gazelle: A Low Latency Framework for Secure Neural Network Inference", 27th USENIX Security Symposium, Aug. 15-17, 2018. pp. 1650-1668.

Bösch et al., "SOFIR: Securely Outsourced Forensic Recognition," 2014 IEEE International Conference on Acoustic, Speech and Signal Processing (ICASSP), IEEE 978-1-4799-4/14, 2014, pp. 2713-2717.

Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.

Bajpai et al., "A Fully Homomorphic Encryption Implementation on Cloud Computing," International Journal of Information & Computation Technology, ISSN 0974-2239 vol. 4, No. 8, 2014, pp. 811-816.

Williams, Ellison Anne et al., "Wideskies: Scalable Private Information Retrieval," Jun. 8, 2016, 14 pages.

Viejo et al., "Asymmetric homomorphisms for secure aggregation in heterogeneous scenarios," Information Fusion 13, Elsevier B.V., Mar. 21, 2011, pp. 285-295.

Patil et al, "Big Data Privacy Using Fully Homomorphic Non-Deterministic Encryption," IEEE 7th International Advance Computing Conference, Jan. 5-7, 2017, 15 pages.

Panda et al., "FPGA Prototype of Low Latency BBS PRNG," IEEE International Symposium on Nanoelectronic and Information Systems, Dec. 2015, pp. 118-123, 7 pages.

Sahu et al., "Implementation of Modular Multiplication for RSA Algorithm," 2011 International Conference on Communication Systems and Network Technologies, 2011, pp. 112-114, 3 pages.

Drucker et al., "Achieving trustworthy Homomorphic Encryption by combining it with a Trusted Execution Environment," Journal of Wireless Mobile Networks, Ubiquitous Computing, and Dependable Application (JoWUA), Mar. 2018, pp. 86-99.

Google Scholar, search results for "trusted execution environment database", 2 pages, Aug. 1, 2020.

* cited by examiner

SECURE WEB BROWSING VIA HOMOMORPHIC ENCRYPTION

CROSS REFERENCE TO RELATED APPLICATIONS

This application claims the benefit and priority of U.S. Provisional Application Ser. No. 62/448,916, filed on Jan. 20, 2017; U.S. Provisional Application Ser. No. 62/448,883, filed on Jan. 20, 2017; U.S. Provisional Application 62/448,885, filed on Jan. 20, 2017; and U.S. Provisional Application Ser. No. 62/462,818, filed on Feb. 23, 2017, all of which are hereby incorporated by reference herein, including all references and appendices, for all purposes.

FIELD OF THE PRESENT TECHNOLOGY

The present disclosure relates to the technical field of encryption and decryption methods and apparatus as applied to computing systems. More particularly, the present invention is in the technical field of homomorphic encryption methods and apparatus.

SUMMARY

The present invention is a system and/or method for secure web browsing using a homomorphically encrypted query within an end-to-end secure web browser system that uses homomorphic encryption. The system and/or method includes static web pages loaded into data sources of content that support homomorphically encrypted queries. The system and/or method securely executes a user request and/or query using homomorphic encryption techniques, via embedded web browser techniques.

Various embodiments of the present technology include a method of receiving at the client an action via a web browser; converting the action to a query; encrypting the query using a homomorphic encryption scheme at the client; sending the encrypted query from the client to the server. The method further includes receiving at a server an encrypted query from a client, the query encrypted using a homomorphic encryption scheme, the encrypted query received without a key for decrypting the query; evaluating the encrypted query over web content D without decrypting the encrypted query to produce an encrypted response; and sending the encrypted response from the server to the client for decryption at the client. The method further includes receiving at the client the encrypted response from the server; decrypting the response to produce an unencrypted result at the client; and using the unencrypted result at the web browser.

Various embodiments of the present technology include a system including a browser configured to receive an action from a user. The system further includes a client configured to convert the action to a query, encrypt the query using a homomorphic encryption scheme and an encryption key, send the encrypted query to a server without the encryption key, and decrypt an encrypted response using the homomorphic encryption scheme and the key. The system further includes a server configured to receive the encrypted query without the encryption key from the client via a network, evaluate the encrypted query over web content D to generate an encrypted response without decrypting the encrypted query and without decrypting the encrypted response, and send the encrypted response to the client.

Various embodiments of the present technology include a non-transitory computer readable storage media having a program embodied thereon, the program being executable by a processor at a client to perform a method for secure queries of web content D, the method comprising receiving the action from a web browser; converting an action to a query; encrypting the query using a homomorphic encryption scheme and a public encryption key; sending the encrypted query to one or more servers without a corresponding private encryption key. The method further includes receiving an encrypted response from the one or more servers, the encrypted response generated from an evaluation of the encrypted query over the web content D at the one or more servers, the evaluation having been performed without decrypting the encrypted query and without decrypting the encrypted response. The method further includes decrypting the encrypted response to generate an unencrypted result of the action over the web content D and providing the unencrypted result to a web browser for use by the web browser.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Homomorphic encryption is a form of encryption in which a specific algebraic operation (generally referred to as addition or multiplication) performed on data is equivalent to another operation performed on the encrypted form of data. For example, in Partially Homomorphic Encryption (PHE) schemes, multiplication performed on data such as ciphertext may be equal to addition of the same values in plaintext. Thus, a specific operation performed on homomorphically encrypted data (e.g., a web action or web operation) may generate an encrypted response, which, when decrypted, allows recovery of the result of the operation as if it had been performed on the unencrypted data. For example, a homomorphically encrypted web action such as a query may be evaluated over web content to generate an encrypted response including resulting web content. The encrypted response may be decrypted, and the decrypted response may be used to recover the resulting web content from evaluation of the encrypted query as if unencrypted query had been evaluated over the web content.

Homomorphic encryption can also be used to securely chain together multiple operations on homomorphically encrypted data without exposing unencrypted data. The result of the multiple chained operations can then be recovered as if the multiple operations had been performed on the unencrypted data. It is noteworthy that if web browsing includes multiple operations using homomorphic encryption, the results of the operations performed on homomorphically encrypted data may be recovered as if the operations had been performed on unencrypted data. For example, a homomorphically encrypted query may include a chain of operations to be evaluated over web content to generate an encrypted query response. The unencrypted result of the chain of operations may be web content and/or analytics of the web content. The result of the query evaluation may be recovered using decryption of the encrypted query response as if the query operations had been performed on web content using an unencrypted query.

Figure 1A:
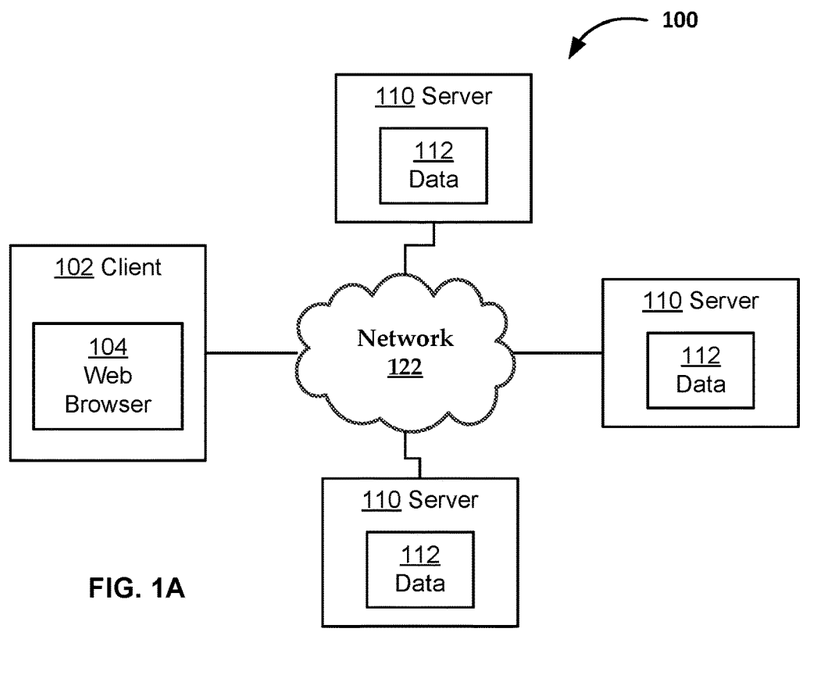
FIG. 1A illustrates an exemplary end-to-end encryption system, in accordance with aspects of the claimed technology.
Figure 1B:
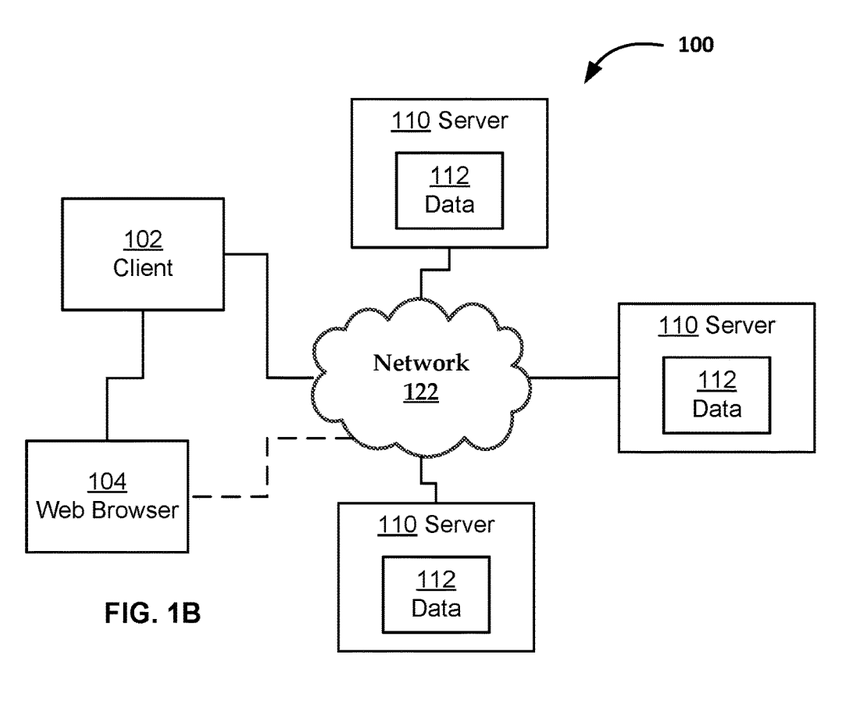
FIG. 1B illustrates an exemplary end-to-end encryption system, in accordance with aspects of the claimed technology.

FIG. 1A and FIG. 1B illustrate exemplary end-to-end encryption systems 100 in accordance with aspects of the claimed technology. The encryption system 100 may provide for end-to-end secure web actions, such as queries, using homomorphic encryption. The encryption system 100 includes a client 102, a web browser 104, and one or more servers 110 that include data 112. FIGS. 1A and 1B illustrates one client 102 and three servers 110 that include data 112. However, the encryption system 100 may comprise more than one client 102. Also, the encryption system 100 may comprise more servers 110 or fewer servers 110 that include data 112. In some embodiments, a plurality of clients 102 communicate encrypted analytics to one server 110 and receive encrypted responses from the server 110. In some embodiments, one client 102 communicates encrypted analytics to a plurality of servers 110 and receives encrypted responses from the plurality of servers 110. In some embodiments, one client 102 communicates encrypted analytics to one server 110 and receives encrypted responses from the server 110. In some embodiments, a plurality of clients 102 communicate encrypted analytics to a plurality of servers 110 and receive encrypted responses from the plurality of servers 110. In general, one or more clients 102 communicate encrypted analytics to, and/or receive encrypted responses from, one or more of servers 110. While in general, one or more clients 102 and one or more servers 110 is contemplated, where for simplicity the case of one client 102 and multiple servers 110 is illustrated elsewhere herein, it is no way intended to limit the practice of the claimed technology to a single client 102 and/or a plurality of servers 110. Thus, various descriptions of modules, acts, communications, and/or acts that are illustrated in the context of one client 102 for simplicity and clarity, may apply to multiple clients 102 and vice versa. Similarly, various descriptions of modules, acts, communications, and/or acts that are illustrated in the context of one client server 110 for simplicity and clarity, may apply to multiple servers 110 and vice versa.

In various embodiments, the client 102 resides in computing environments that include shared computing architectures, hybrid architectures, distinct architectures such as those in a cloud computing environment, and/or the like. The client 102 and the web browser 104 of FIG. 1A are co-located such that computations are performed by the client 102 on the same computing device on which the web browser 104 is located. FIG. 1B differs from FIG. 1A in that the client 102 and the web browser 104 of FIG. 1B are located on different computing devices; the client 102 and web browser 104 of FIG. 1B communicate directly and/or via the network 122. The network 122 may be various combinations and permutations of wired and wireless networks (e.g., Ethernet, Wi-Fi, Bluetooth, mobile broadband, the Internet, etc.), internal/external computer busses, and/or the like. In some embodiments, one or more clients 102 communicate directly with one or more servers 110.

There may be multiple servers 110 having data 112 that are available for access from the client 102 using the web browser 104, as illustrated in FIGS. 1A and 1B. A target data source D contains content of one or more static web pages or web sites. For simplicity, "target data source D" will also be referred to as "content D" or "web content D." The web content D may reside in data 112 on a single server 110 or may be distributed over data 112 in multiple servers 110 in the encryption system 100, in a plurality of distinct locations, which could include different blades in a server system, containers in a cloud, or servers that are geographically remote from one another, just as examples. Thus, the web content D could be partly stored on one or more data 112, partly on a cloud (not illustrated), or the data source could be wholly stored on either. In various embodiments, the web content D is unencrypted (in plaintext form), deterministically encrypted, semantically encrypted, and/or other similar formats that would be known to one of ordinary skill in the art with the present disclosure before them, or any combination thereof.

FIGS. 1A and 1B illustrate three servers 110 that include data 112. However, the encryption system 100 may comprise more servers 110 or fewer servers 110. The encryption system 100 of FIGS. 1A and 1B illustrates a single client 102 and web browser 104. However, the encryption system 100 may comprise multiple clients 102 and/or multiple web browsers 104. In some embodiments, the client 102 and/or web browser 104 are implemented on multiple systems and/or locations. In various embodiments, the client(s) 102, web browser(s) 104, and/or the server(s) 110 are implemented in varied computing environments, including a shared computing architectures, hybrid architectures, or distinct architectures such as those in a cloud computing environment.

Figure 2:
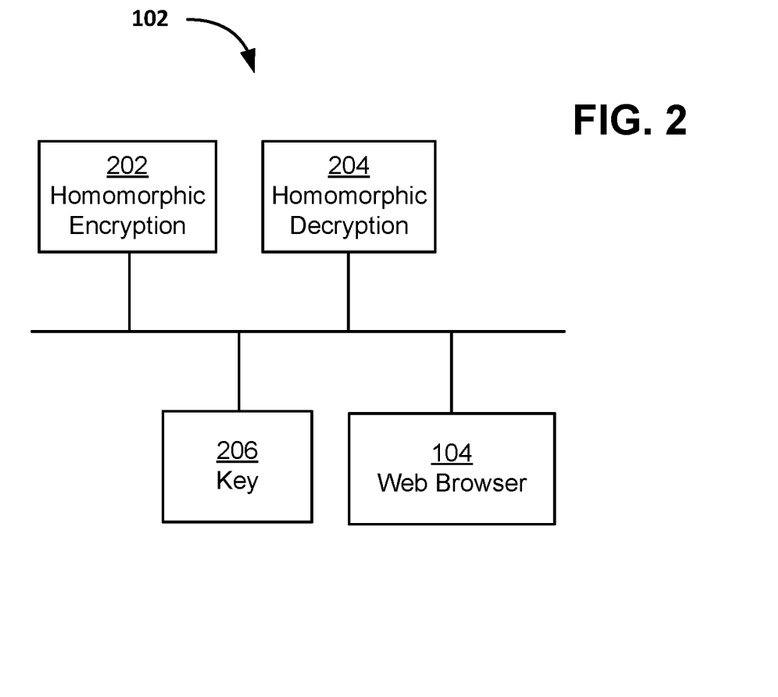
FIG. 2 illustrates details of a client of FIG. 1A.

FIG. 2 illustrates details of the client 102 of FIG. 1A. The client 102 includes a homomorphic encryption module 202, a homomorphic decryption module 204, and an encryption key 206. The homomorphic encryption module 202, homomorphic decryption module 204, and an encryption key 206 may be associated with a homomorphic encryption scheme E, such as Paillier encryption, or any other homomorphic encryption. The homomorphic encryption scheme E may be a fully or partially homomorphic encryption scheme. Examples of partially homomorphic cryptosystems include: RSA (multiplicative homomorphism), ElGamal (multiplicative homomorphism), and Paillier (additive homomorphism). Other partially homomorphic cryptosystems include the Okamoto-Uchiyama, Naccache-Stern, Damgård-Jurik, Sander-Young-Yung, Boneh-Goh-Nissim, and Ishai-Paskin cryptosystems. Examples of fully homomorphic cryptosystems include: the Brakerski-Gentry-Vaikuntanathan, Brakerski's scale-invariant, NTRU-based, and Gentry-Sahai-Waters (GSW) cryptosystems.

FIG. 2 illustrates a single encryption key 206. However, in some embodiments the encryption key 206 includes a public key and a private key. FIG. 2 further illustrates a web browser 104 as being co-located with the client 102, as in FIG. 1A. However, the web browser may be in communication with the client 102 directly and/or via the network 122, as illustrated in FIG. 1B. While FIG. 2 illustrates the homomorphic encryption module 202, homomorphic decryption module 204, and an encryption key 206 as components of the client 102, in some embodiments, the homomorphic encryption module 202, homomorphic decryption module 204, and/or the encryption key 206 are components of the web browser 104. Thus, encryption and/or decryption may be performed by the client 102 or the web browser 104 or a combination of the client 102 and the web browser 104.

An action over the web content D may be specified by a user via the web browser 104. The client 102 may receive the action from the web browser 104. The action may be a single operation (e.g., fetch of an object) or a chain of actions (e.g., database search and classification of search results). The client 102 may convert the action into a query Q to be executed over the web content D. Using the homomorphic encryption scheme E, the encryption system 100 may encode the query Q as a homomorphically encrypted query Q_E using the homomorphic encryption module 202 and encryption key 206. In various embodiments, the query Q_E is encoded as a homomorphic query vector, a homomorphic query matrix, homomorphic query parameters, and/or the like. The encrypted query Q_E is completely encrypted. The query Q cannot be recovered from encrypted query Q_E without using the encryption key 206, which is associated with encryption scheme E. The homomorphic decryption module 204 is configured to use the encryption key 206 to evaluate an operation K{Q_E, E}, which decrypts the encrypted query Q_E using the encryption scheme E and encryption key 206. In some embodiments, the homomorphic decryption module 204 uses a private key of the encryption key 206 to evaluate an operation K{Q_E, E}, which decrypts the encrypted query Q_E using the encryption scheme E and the private key.

The client 102 may send the encrypted query Q_E to one or more servers 110 containing the web content D in data 112. However, the client 102 does not send the encryption key 206 to any of the servers 110. Thus, servers 110 are not able to recover the query Q from the encrypted query Q_E, without the encryption key 206.

Figure 3:
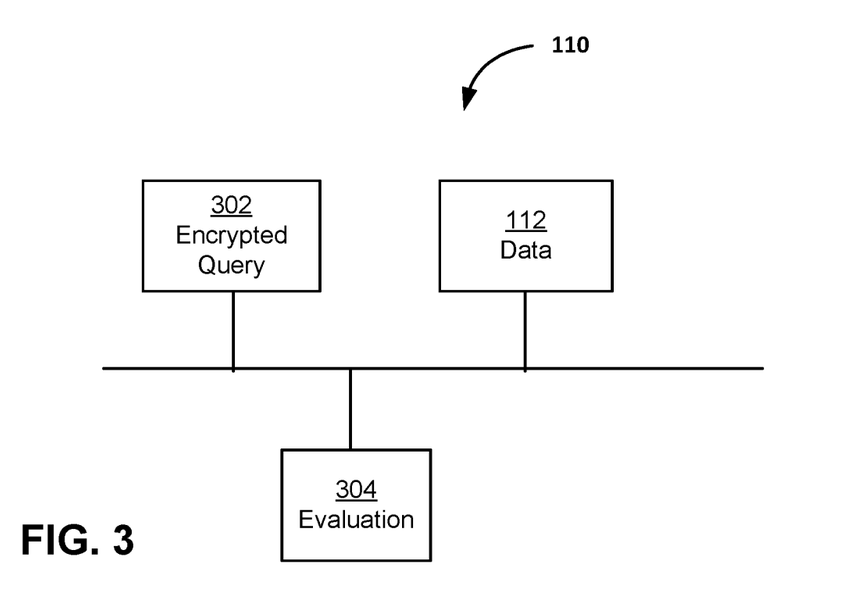
FIG. 3 illustrates details of a server of FIG. 1A and FIG. 1B.

FIG. 3 illustrates details of the server 110 of FIG. 1. In addition to the data 112, the server 110 includes the encrypted query (Q_E 302) received from the client 102 and an evaluation module 304. The encrypted query Q_E 302 may be received from the client without the encryption key 206. Thus, the server 110 is unable to recover or expose the query Q, because the server 110 is unable decrypt the encrypted query Q_E 302 without the encryption key 206. The evaluation of a homomorphically encrypted query Q_E 302 over data may produce an encrypted response E(R), from which an unencrypted contents R may be recovered using the encryption key 206.

Using techniques of the homomorphic encryption scheme E, one or more server 110 evaluates the encrypted query Q_E 302 over web content D, which resides within the one or more of, respective, data 112. The evaluation may produce an encrypted response E(R).

The operation of evaluating the encrypted query Q_E 302 is performed without decrypting the encrypted query Q_E 302 at the server 110, and without revealing the unencrypted query Q to the owner of the data 112, an observer, or an attacker. Further, the operation of evaluating the encrypted query Q_E 302 is also performed without decrypting the encrypted response E(R), or revealing the contents R of the encrypted response E(R) to the owner of the data 112, an observer, or an attacker. This is because encryption key 206 is not available at any of the one or more servers 110.

The server 110 sends the encrypted response E(R) to the client 102. Using the encryption key 206 associated with encrypted query Q_E 302, the homomorphic decryption module 204 of the client 102 may apply the operation K{E(R), E} to decrypt the encrypted response E(R) to obtain the results R of the query Q. The results R may be used and/or displayed by the web browser 104.

In general, a server (e.g., server(s) 110) comprises one or more programs that share their resources with clients (e.g., client 102). Server programs may be implemented on one or more computers. A client may request content (e.g., web content D) from a server or may request the server to perform a service function while not sharing any of the client's resources. Whether a computer is a client, a server, or both, is determined by the nature of the application that requires the service functions.

While a single client 102 is illustrated in the encryption system 100 of FIG. 1, the encryption system 100 may comprise multiple clients 102 that share one or more web browsers 104. For example, a first client 102 may encrypt a query using the homomorphic encryption scheme E. The encrypted query may be sent via a first web browser 104 to one or more servers 110 with directions to evaluate the encrypted query Q_E 302 over the web content D, and to return the encrypted response E(R) to a second client 102, via a second web browser 104 where the encrypted response E(R) may be decrypted to obtain the unencrypted result or result R.

In some embodiments, the client 102 and/or servers 110 may implement an application programming interface (API) to formalize data exchange. Both client 102 and server 110 may reside in the same system, and client software may communicate with server software within the same computer.

In some instances, the functions of the client 102 and/or servers 110 are implemented within a cloud-based computing environment, not illustrated. The client 102 and/or servers 110 may be communicatively coupled via the network 122 with a cloud based computing environment. In general, a cloud-based computing environment is an internet resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

Figure 4:
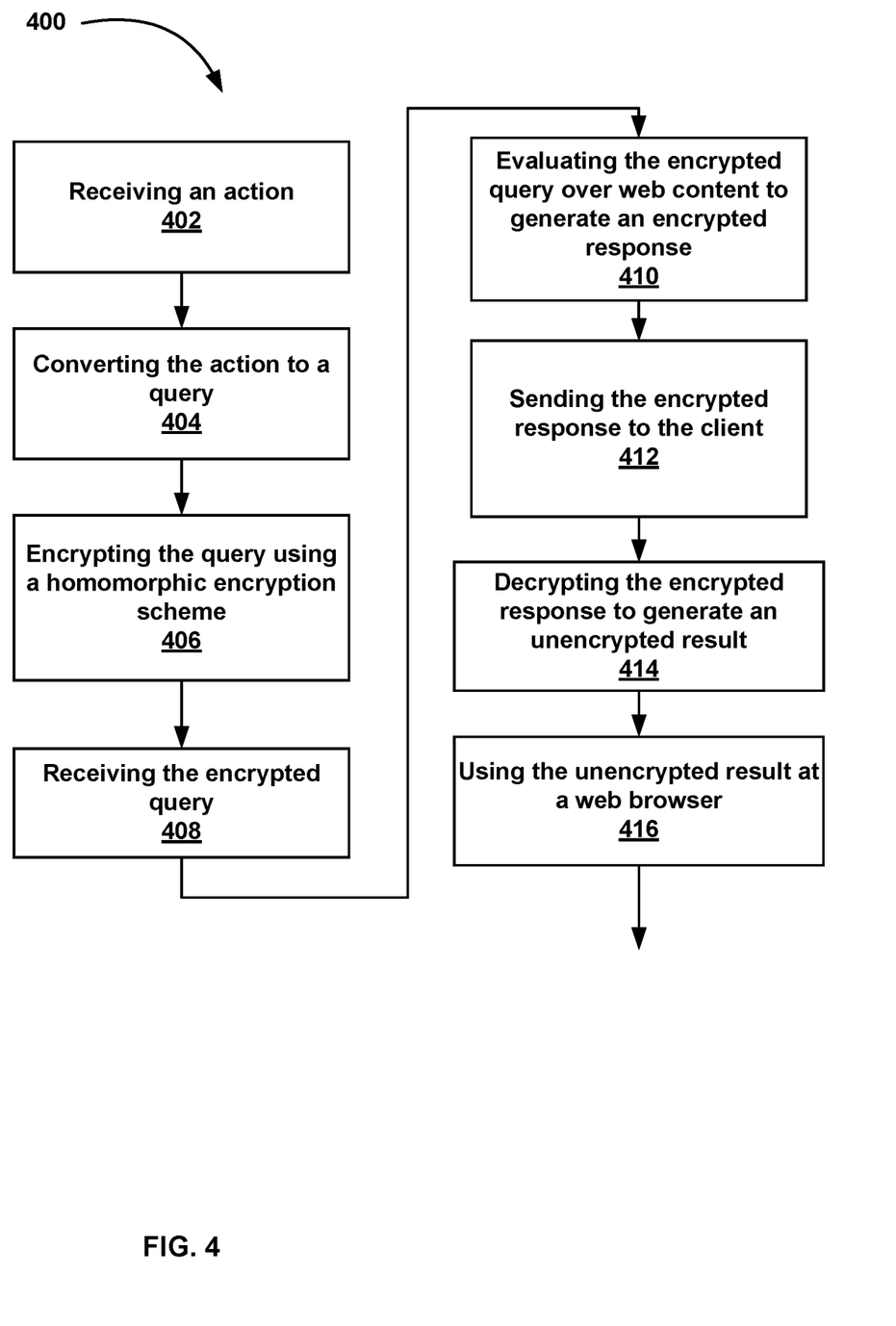
FIG. 4 is a flowchart illustrating an exemplary method for end-to-end encryption, in accordance with various aspects of the technology.

FIG. 4 is a flowchart of an exemplary method 400 for end-to-end encryption, in accordance with various aspects of the technology. The method comprises a step 402 of receiving an action. The action may be received at the client 102, from a user via the web browser 104. At step 404, the action is converted to a query. The action may be converted to a query Q at the client 102 and/or web browser 104. At step 406, the query Q is converted to an encrypted query Q_E 302. The query may be encrypted at one or more client(s) 102 using a homomorphic encryption scheme. The encrypted query Q_E 302 may be sent from the client 102 to the server 110 without the encryption key. The method 400 comprises a step 408 of receiving the encrypted query from the client 102. The encrypted query may be received directly or via a network, e.g., the Internet, at one or more servers 110.

The method 400 further comprises a step 410 of evaluating the encrypted query Q_E over web content D to generate an encrypted response E(R). The web content D may reside in data 112 at one or more servers 110. The encrypted query may be evaluated without decrypting the encrypted query Q_E 302 and without exposing the unencrypted query Q at the server 110 to the owner of the data 112, an observer, or an attacker. The encrypted query may also be evaluated over web content D without decrypting the encrypted response E(R) and without exposing the unencrypted results R of the encrypted response E(R) at the server 110 to the owner of the data 112, an observer, or an attacker.

The method 400 further comprises a step 412 of sending the encrypted response E(R) to the client 102. The encrypted response E(R) may be sent from one or more servers 110 to the client 102 via the network 122. The method 400 also comprises a step 414 of decrypting the encrypted response E(R) received from the one or more servers 110 at the client 102. The decryption of the encrypted response E(R) generates an unencrypted result R of the evaluation of the encrypted query Q_E over the web content D, as if the unencrypted query Q had been evaluated over the web content D. The method 400 further comprises a step 416 of using the unencrypted result at a web browser. The unencrypted result may be displayed or otherwise used at the web browser 104.

Thus, using the method 400, the query may be evaluated over the web content D in a completely secure and private manner. Moreover, neither the contents nor the results of the query are revealed by the method 400 to the owner of the web content D, an observer, or an attacker.

Figure 5:
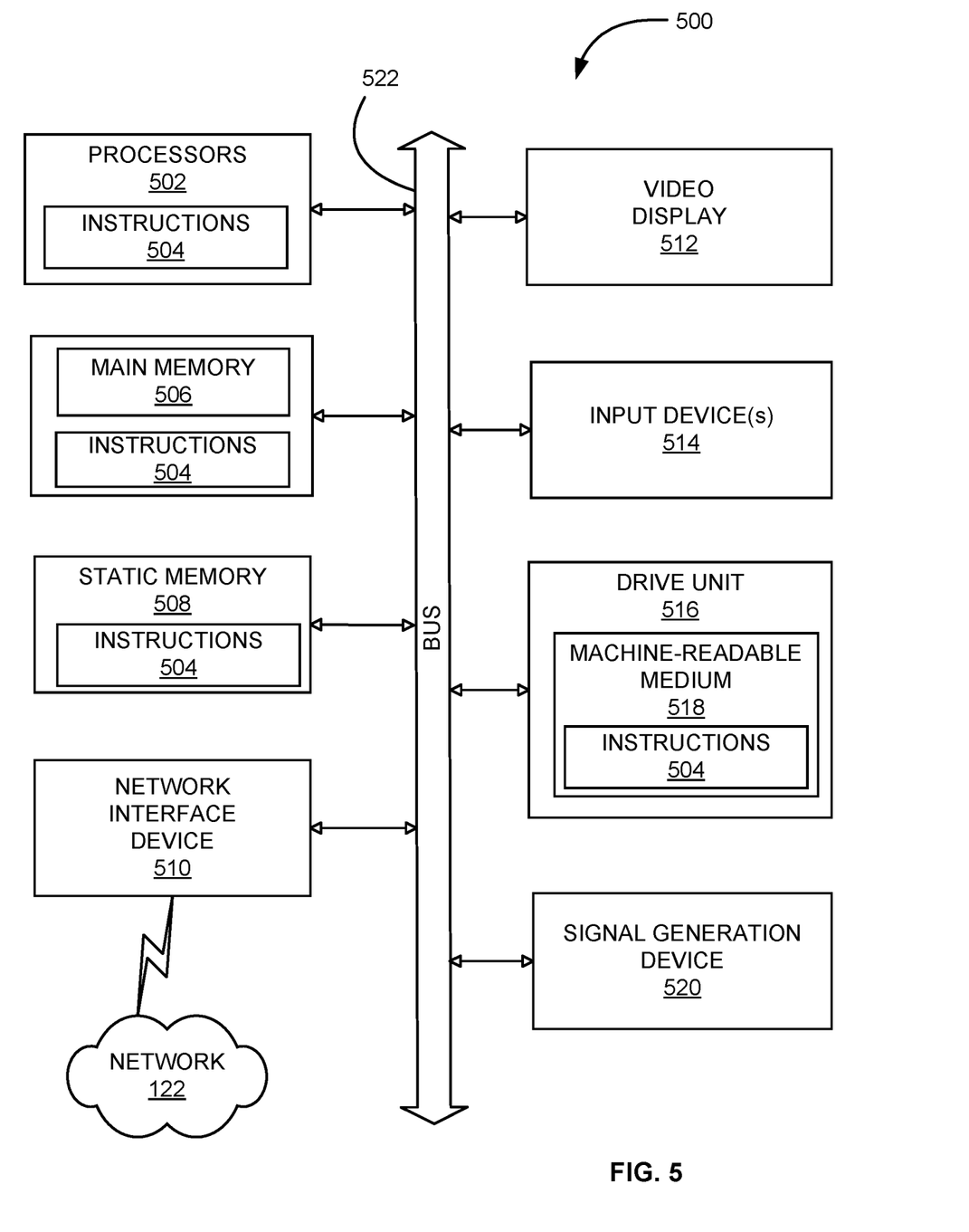
FIG. 5 is a schematic diagram of an exemplary computing system that is used to implement embodiments according to the present technology.

FIG. 5 is a diagrammatic representation of an example machine in the form of a computer system 500, within which a set of instructions for causing the machine to perform any of one or more of the methodologies discussed herein may be executed. In various example embodiments, the machine operates as a standalone device or may be connected (e.g., networked) to other machines. In a networked deployment, the machine may operate in the capacity of a server (e.g. server 110) or a client (e.g., client 102) machine, in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated in FIG. 5, the term "machine" shall also be taken to include any collection of machines that individually or jointly execute a set (or multiple sets) of instructions to perform any one or more of the methodologies discussed herein The example computer system 500 includes a processor or multiple processor(s) 502 (e.g., a central processing unit (CPU), a graphics processing unit (GPU), or both), and a main memory 506 and static memory 508, which communicate with each other via a bus 522. The computer system 500 may further include a video display 512 (e.g., a liquid crystal display (LCD)). The computer system 500 may also include an alpha-numeric input device(s) 514 (e.g., a keyboard), a cursor control device (e.g., a mouse, trackball, touchpad, touch screen, etc.), a voice recognition or biometric verification unit (not shown), a disk drive unit 516 (also referred to as disk drive unit), a signal generation device 520 (e.g., a speaker), and a network interface device 510. The computer system 500 may further include a data encryption module (shown elsewhere herein) to encrypt data.

The disk drive unit 516 includes a computer or machine-readable medium 518 on which is stored one or more sets of instructions and data structures (e.g., instructions 504) embodying or utilizing any one or more of the methodologies or functions described herein. The instructions 504 may also reside, completely or at least partially, within the main memory 506 and/or within the processor(s) 502 during execution thereof by the computer system 500. The main memory 506 and the processor(s) 502 may also constitute machine-readable media.

The instructions 504 may further be transmitted or received over a network (e.g., network 122, see also FIG. 1) via the network interface device 510 utilizing any one of a number of well-known transfer protocols (e.g., Hyper Text Transfer Protocol (HTTP)). While the machine-readable medium 518 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and/or the like. The example embodiments described herein may be implemented in an operating environment comprising software installed on a computer, in hardware, or in a combination of software and hardware.

The corresponding structures, materials, acts, and equivalents of any means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art with this disclosure before them that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "co-located") may be occasionally interchangeably used with its non-hyphenated version (e.g., "co-located"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
   receiving at a server an encrypted query from a client, the encrypted query being a homomorphic query matrix encrypted from a query using a homomorphic encryption scheme, the encrypted query received without a key for decrypting the encrypted query;
   evaluating the encrypted query over web content D without decrypting the encrypted query to produce an encrypted response; and
   sending the encrypted response from the server to the client for decryption at the client.

2. The method of claim 1, further comprising:
receiving at the client an action via a web browser;
converting the action to the query at the client;
encrypting the query using the homomorphic encryption scheme at the client;
sending the encrypted query from the client to the server;
receiving at the client the encrypted response from the server;
decrypting the response to produce an unencrypted result at the client; and
using the unencrypted result at the web browser.

3. The method of claim 2, wherein the web browser and the client communicate via a network.

4. The method of claim 2, wherein the client and the web browser are co-located on a same computing device.

5. The method of claim 1, wherein the query is a chain of series of operations to be performed over the web content D.

6. The method of claim 1, further comprising receiving at the client an action from a web browser.

7. The method of claim 1, further comprising:
receiving at the client an action from a web browser; and
converting the action to the query at the client.

8. The method of claim 1, further comprising:
receiving at the client the encrypted response;
decrypting at the client the response to produce an unencrypted result; and
using the unencrypted result at a web browser.

9. The method of claim 1, wherein the homomorphic encryption scheme is Paillier encryption.

10. The method of claim 1, wherein the key includes a private encryption key.

11. A system comprising:
a browser configured to receive an action from a user;
a client configured to:
  convert the action to a query;
  encrypt the query using a homomorphic encryption scheme and an encryption key, the homomorphic encryption scheme encrypting the query as a homomorphic query matrix;
  send the encrypted query to a server without the encryption key; and
  decrypt an encrypted response using the homomorphic encryption scheme and the encryption key; and
the server configured to:
  receive the encrypted query without the encryption key from the client via a network;
  evaluate the encrypted query over web content D to generate the encrypted response without decrypting the encrypted query and without decrypting the encrypted response; and
  send the encrypted response to the client.

12. The system of claim 11, wherein the action is a chain of series of operations to be performed over the web content D.

13. The system of claim 11, wherein the client and the browser are co-located such that client computations are computed on a same computing device on which the browser is located.

14. The system of claim 11, wherein the encryption key is a private encryption key.

15. A non-transitory computer readable storage media having a program embodied thereon, the program being executable by a processor at a client to perform a method for secure queries of web content D, the method comprising:
converting an action to a query;
encrypting the query using a homomorphic encryption scheme and a public encryption key, the homomorphic encryption scheme encrypting the query as a homomorphic query matrix;
sending the encrypted query to one or more servers without a corresponding private encryption key;
receiving an encrypted response from the one or more servers, the encrypted response generated from an evaluation of the encrypted query over the web content D at the one or more servers, the evaluation having been performed without decrypting the encrypted query and without decrypting the encrypted response; and
decrypting the encrypted response to generate an unencrypted result of the action over the web content D.

16. The non-transitory computer readable storage media of claim 15, wherein the action is a chain of series of operations to be performed over the web content D.

17. The non-transitory computer readable storage media of claim 16, wherein the operations include a document search and a classification of the unencrypted result of the document search.

18. The non-transitory computer readable storage media of claim 15, wherein the method further comprises:
receiving the action from a web browser; and
providing the unencrypted result to the web browser for use by the web browser.

19. The non-transitory computer readable storage media of claim 18, wherein the web browser and the client are co-located such that client computations are computed on a same computing device on which the web browser is located.

20. The non-transitory computer readable storage media of claim 15, wherein the homomorphic encryption scheme is Paillier encryption.

* * * * *